US009390091B2

(12) United States Patent
Eronen et al.

(10) Patent No.: US 9,390,091 B2
(45) Date of Patent: Jul. 12, 2016

(54) METHOD AND APPARATUS FOR PROVIDING MULTIMEDIA SUMMARIES FOR CONTENT INFORMATION

(75) Inventors: Antti Johannes Eronen, Tampere (FI); Juha Henrik Arrasvuori, Tampere (FI)

(73) Assignee: NOKIA CORPORATION, Espoo (FI)

( * ) Notice: Subject to any disclaimer, the term of this patent is extended or adjusted under 35 U.S.C. 154(b) by 689 days.

(21) Appl. No.: 13/585,546

(22) Filed: Aug. 14, 2012

(65) Prior Publication Data

US 2014/0052281 A1 Feb. 20, 2014

(51) Int. Cl.
*G06F 17/00* (2006.01)
*G06F 17/30* (2006.01)
*G06F 3/16* (2006.01)

(52) U.S. Cl.
CPC .......... *G06F 17/30017* (2013.01); *G06F 3/165* (2013.01)

(58) Field of Classification Search
CPC ............. G06Q 50/01; G06F 17/30017; G06F 17/3002; G06F 17/30023; G06F 17/3005; G06F 17/30058; G06F 17/30061; G06F 17/30064; G06F 17/30719; G06F 17/30716; G06F 17/30713; G06F 17/30994; G06F 3/04817; G06F 17/00; G06F 17/30867
See application file for complete search history.

(56) References Cited

U.S. PATENT DOCUMENTS

| 2005/0055267 | A1 | 3/2005 | Chasanoff et al. |
| 2008/0027909 | A1* | 1/2008 | Gang ................ G06F 17/30873 |
| 2010/0319518 | A1 | 12/2010 | Mehta |
| 2011/0066941 | A1 | 3/2011 | Chipchase et al. |
| 2011/0098056 | A1 | 4/2011 | Rhoads et al. |
| 2011/0161085 | A1* | 6/2011 | Boda ...................... G06Q 30/02 704/260 |
| 2011/0296324 | A1 | 12/2011 | Goossens et al. |
| 2012/0200567 | A1 | 8/2012 | Mandel et al. |

FOREIGN PATENT DOCUMENTS

WO 2012/012080 A2 1/2012

OTHER PUBLICATIONS

International Search Report for corresponding International Patent Application No. PCT/FI2013/050680 dated Sep. 30, 2013, 6 pages.
International Written Opinion for corresponding International Patent Application No. PCT/FI2013/050680 dated Sep. 30, 2013, 11 pages.

* cited by examiner

*Primary Examiner* — Fan Tsang
*Assistant Examiner* — David Siegel
(74) *Attorney, Agent, or Firm* — Ditthavong & Steiner, P.C.

(57) ABSTRACT

An approach is provided for creating multimedia summary for content information. The approach involves receiving a multimedia signal request from a mobile communication device, wherein content information of the mobile communication device is determined and processed. The approach also involves determining the characteristic of the content information, and then determining and processing the multimedia signal based on the characteristic. Then, the multimedia converter causes transmission of the multimedia signal to the user device.

20 Claims, 13 Drawing Sheets

METHOD AND APPARATUS FOR PROVIDING MULTIMEDIA SUMMARIES FOR CONTENT INFORMATION

BACKGROUND

Service providers and device manufacturers (e.g., wireless, cellular, etc.) are continually challenged to deliver value and convenience to consumers by, for example, providing compelling network services. One such service is the provisioning of multimedia summaries for content information. For example, service providers provide services that enable communication between users and sharing of different contents (e.g., textual data, images, videos, etc. of social networking information, news feed information, one or more content files, or a combination thereof) between the users. It is tedious and takes a lot of effort for the users to browse through such information because the information is visual (text and image format). Such drawback diminishes the effectiveness and efficiency of the services rendered. Therefore, service providers and device manufacturers face significant challenges in providing multimedia summaries for the content information based on their characteristics.

SOME EXAMPLE EMBODIMENTS

Therefore, there is a need for an effective and efficient approach for enhancing optimal user experience by auralization of content information, solving the problem of having to browse through large volume of content information in a social networking service, in a user friendly manner.

According to one embodiment, a method comprises processing and/or facilitating a processing of content information to determine one or more characteristics of (a) the content information, (b) at least one multimedia file, or (c) a combination thereof. The method also comprises causing, at least in part, a rendering of the at least one multimedia signal as at least one summary of the content information based, at least in part, on the one or more characteristics.

According to another embodiment, an apparatus comprises at least one processor, and at least one memory including computer program code for one or more computer programs, the at least one memory and the computer program code configured to, with the at least one processor, cause, at least in part, the apparatus to process and/or facilitate a processing of content information to determine one or more characteristics of (a) the content information, (b) at least one multimedia file, or (c) a combination thereof. The apparatus also causes, at least in part, a rendering of the at least one multimedia signal as at least one summary of the content information based, at least in part, on the one or more characteristics.

According to another embodiment, a computer-readable storage medium carries one or more sequences of one or more instructions which, when executed by one or more processors, cause, at least in part, an apparatus to process and/or facilitate a processing of content information to determine one or more characteristics of (a) the content information, (b) at least one multimedia file, or (c) a combination thereof. The apparatus also causes, at least in part, a rendering of the at least one multimedia signal as at least one summary of the content information based, at least in part, on the one or more characteristics.

According to another embodiment, an apparatus comprises means for processing and/or facilitating a processing of content information to determine one or more characteristics of (a) the content information, (b) at least one multimedia file, or (c) a combination thereof. The apparatus also comprises means for causing, at least in part, a rendering of the at least one multimedia signal as at least one summary of the content information based, at least in part, on the one or more characteristics.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of the method claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for providing multimedia summaries for content information based on their characteristics are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
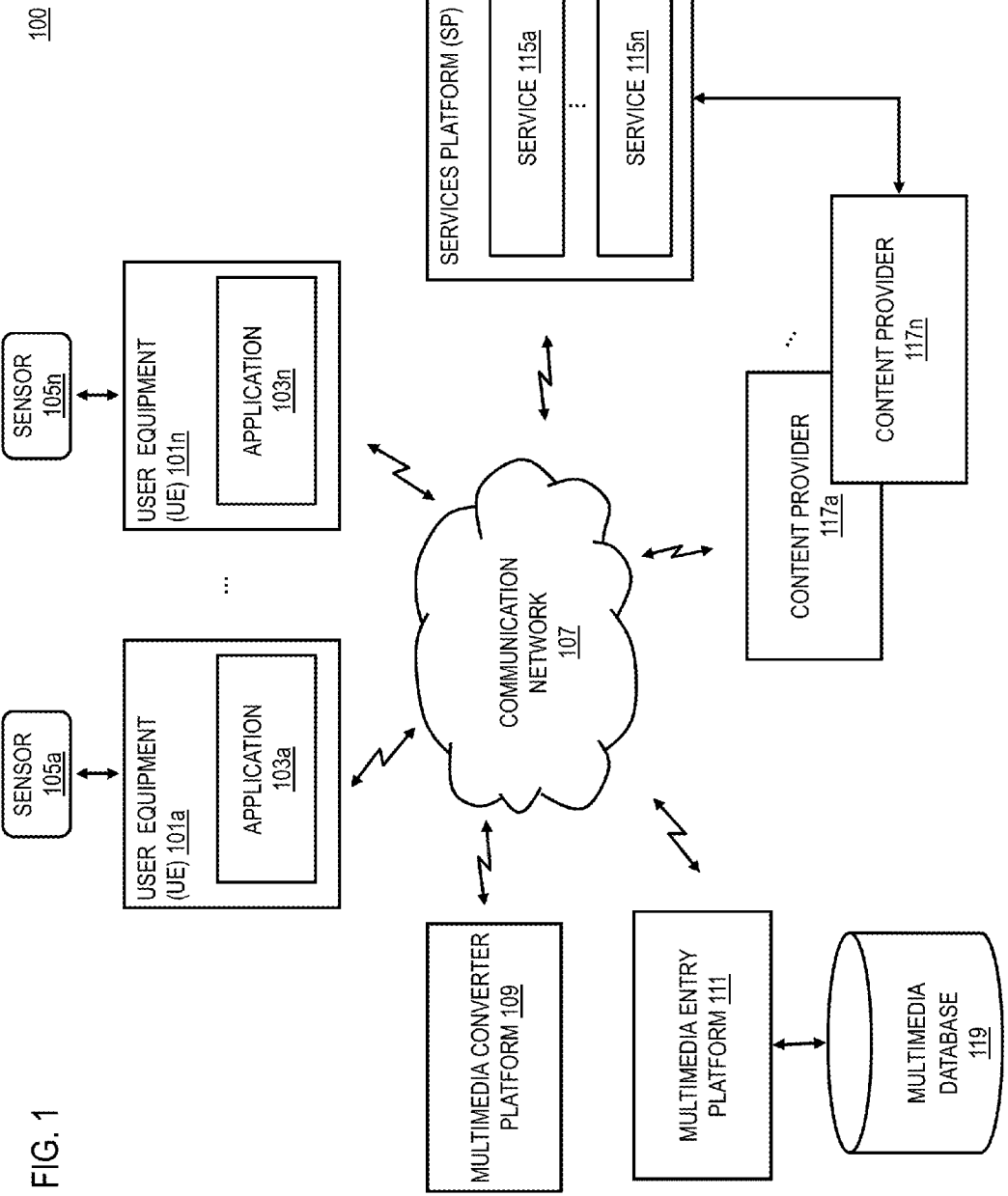
FIG. 1 is a diagram of a system capable of providing a multimedia signal as a summary of the content information, according to one embodiment.

FIG. 1 is a diagram of a system capable of providing multimedia summaries for content information based on their characteristics, according to one embodiment. As mentioned, service providers and device manufacturers are continually challenged to provide compelling network services, that may include a multimedia converter platform that enable multimedia summaries for content information based on their characteristics, between the users. The existing service provided by mobile communication devices for following the information in the social network takes a lot of time and conscious effort because this information is visual. When there are several information updates in the social network, such updates becomes less effective and have weak effect on the recipient because the user may have to browse through a long list of textual updates which is not the optimal user experience.

To address this problem, a system 100 of FIG. 1 introduces the capability to provide multimedia summaries for content information based on their characteristics. The system 100 provides the ability to enhance user experience by providing an auralization mechanism where the textual information and/or other visual information are used as a basis for generating audio, which can be perceived as an ambient background element. In addition, other cross-media methods for summarizing and presenting social media information are provided. For example, to further enhance user experience, an entertaining content of a comic strip that seems appropriate for the user based on the content information can be displayed with the audio. By way of example, a mobile device collects information relating to the user operating the mobile device (i.e., user-related information) from various sources associated with the mobile device. The mobile device may then transmit at least a subset of the information collected to the multimedia converter platform, which uses the user-related information received to select, from a plurality of existing audio and other media alternatives accessible by the platform. The multimedia converter platform before transmitting the selected audio and visual data to the user modifies one or more parameters of the audio and visual data in order to further personalize it.

As shown in FIG. 1, the system 100 comprises user equipment (UE) 101a-101n (collectively referred to as UEs 101) that may include or be associated with applications 103a-103n (collectively referred to as applications 103) and sensors 105a-105n (collectively referred to as sensors 105). By way of example, the applications 103 may be any type of application that is executable at the UE 101, such as media player applications, social networking applications, navigational applications, calendar applications, content provisioning services, etc. In one embodiment, one of the applications 103 at the UE 101 may act as a client for multimedia converter platform 109 and perform one or more functions associated with the functions of the multimedia converter platform 109. In addition, the sensors 105 may be any type of sensor. In one embodiment, the sensors 105 may include one or more sensors that are able to determine user published contents associated with UE 101. In one scenario, the sensors 105 may include location sensors (e.g., GPS), light sensors, moisture sensors, pressure sensors, audio sensors (e.g., microphone), or receivers for different short-range communications (e.g., Bluetooth, WiFi, etc.).

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

In one embodiment, the multimedia converter platform 109 may be a platform with multiple interconnected components. The multimedia converter platform 109 may include multiple servers, intelligent networking devices, computing devices, components and corresponding software for performing the function of providing multimedia signal as a summary of content information. The multimedia converter platform 109 is a platform that determines and processes content information associated with a device to determine a multimedia summary. As described below, the multimedia converter platform 109 may perform the functions of providing an intermediate service for conversion of a user published contents in the social network. Although illustrated as a separate element of the system 100 in FIG. 1, multimedia converter platform 109, or one or more functions performed by the multimedia converter platform 109, may be embodied in one or more other elements of the system 100, such as in one or more applications 103 of the UEs 101 or one or more services 115a . . . 115n.

In one embodiment, the multimedia converter platform 109 identifies and provides the user with multiple social media services for providing multimedia summary from content based information. The multimedia converter platform 109 may determine a multimedia signal (e.g., a multimedia signal, a video signal, or a combination thereof) that is played by a mobile device upon the occurrence of an event at the mobile device. The event may include, for example, the device receiving an incoming communication (e.g., textual data, images, videos, etc. of social networking information, news feed information, one or more content files, or a combination thereof). Upon the occurrence of the event, the multimedia converter platform 109 may dynamically select a multimedia signal based on the content information associated with the device at which the event occurred and/or the owner of the device.

The multimedia converter platform 109 may compute a set of preferred multimedia signal for users associated with the multimedia converter platform 109. The preferred multimedia signal may be based on social networking information, news feed information, content files, or a combination thereof. The preferred multimedia signals may be dynamically updated as the multimedia converter platform 109 receives updates from UE 101. This information may be stored for each user within the multimedia database 119 associated with the multimedia converter platform 109, as illustrated in FIG. 1. In one embodiment, the preferred multimedia signal may be ordered according to the users' preferences.

Additionally, users associated with the multimedia converter platform 109 may periodically update their contact information associated with the content information such that the multimedia converter platform 109 is aware of the status of the users associated with UE 101. In one embodiment, a service 115 may alternatively update the status of the users at the multimedia converter platform 109. This information may be stored in the multimedia database 119 associated with the multimedia converter platform 109, as illustrated in FIG. 1. The multimedia converter platform 109 includes the ability to determine the associated users continuously and in real time based on the user activity information received from the UE 101 according to certain update intervals. In one embodiment, the multimedia converter platform 109 may control the update intervals.

The multimedia converter platform 109 may determine the multimedia signal based on the status and activity information associated with the devices. In one embodiment, the devices may determine the status and activity information according to, for example, cell ID, WiFi, Bluetooth, etc. communication with other devices and send this information to the multimedia converter platform 109. In such an embodiment, the devices may store information regarding the preferred multimedia signal. A client application 103 at the UE 101 may process the multimedia signal identifiers to select a multimedia signal for the UE 101 or could transmit the multimedia signal identifiers to the multimedia converter platform 109 for the multimedia converter platform 109 to determine and select a multimedia signal. Once the multimedia signal is determined (and/or requested), the multimedia converter platform 109 may transmit the multimedia signal to the requesting device.

Upon receiving a request for a multimedia signal from a device, the multimedia converter platform 109 may dynamically determine the content information associated with the device. Upon determining the content information, the multimedia converter platform 109 may determine a multimedia signal that has an overall best influence on the user hence enhancing user satisfaction and his responsiveness. By way of example, the multimedia converter platform 109 may pick the multimedia signal that appears in the preferred sets of most of the users registered with the multimedia converter platform 109. By way of another example, the multimedia converter platform 109 may give emphasis to the multimedia signal based on the content information and/or the contextual information, associated with the one or more contacts. After picking the multimedia signal, the multimedia converter platform 109 sends the multimedia signal to the requesting device.

In one embodiment, the multimedia converter platform 109 also may process content information to rank the multimedia signal based on their popularity in the social network. The content and contextual information, such as, user profile information, user preference information, contacts profile information, contacts preference information, location information, temporal information, activity information, or a combination, may be taken into consideration. Upon determining the ranking, the multimedia converter platform 109 may give emphasis to the multimedia signal based on the ranking and process the content and contextual information to determine the multimedia signal based on the ranking.

The multimedia converter platform 109 further processes the content information to determine at least one multimedia signal for the device. Because the multimedia converter platform 109 takes into account the device when determining the multimedia signal, the multimedia signal may be an effective tool that the users of the device may better appreciate.

In one embodiment, the multimedia converter platform 109 may process the content information to determine one or more lists of one or more candidate multimedia signal for the device. The multimedia converter platform 109 may determine the lists based on a monitoring of the content information. The monitoring may be performed continuously, periodically, according to a schedule, on demand, or a combination thereof. Based on the monitoring, the multimedia converter platform 109 may cause an updating of the one or more lists, a selected multimedia signal from the one or more lists, or a combination thereof. Accordingly, the multimedia converter platform 109 may monitor for changes in the status and/or activities of the contacts of the device and continuously determine selected multimedia signal for selected devices based on the continuously determined status and/or activities of the contacts of the device.

The lists may be determined based on popularity information of the multimedia signal in comparison to one or more metrics. Thus, in one embodiment, the multimedia converter platform 109 also may determine popularity information associated with the candidate multimedia signal and determine selected multimedia signal based on the popularity information. The popularity information may be determined based on, for example, textual data, images, videos, etc. of social networking information, news feed information, one or more content files, or a combination thereof.

In one embodiment, the multimedia converter platform 109 may process the content information to determine multimedia signal as a summary for the content information. Accordingly, based on the content information, the multimedia converter platform 109 may select a multimedia signal to play at the requesting device. When the requesting device plays the multimedia signal, the users of the device will hear the multimedia signal and may be further motivated to respond to the multimedia signal information compared to if they had not heard the multimedia signal. Where there are multiple information within a content information, the selected multimedia signal may be based on several factors that include, for example, the preferences of the users of the device and, one or more metrics associated with the associations between the users and the provider of the multimedia converter platform 109 (e.g., length of association, quantity of information exchanged, frequency of the content messages, mood information, event information etc.).

In one embodiment, the multimedia converter platform 109 may cause the provided multimedia signal to be mixed with another sound, such as the native/original multimedia signal of the user's device. The multimedia converter platform 109 may combine the native audio and the provided audio using multimedia signal processing techniques with the native audio being played in the background and with the provided audio being played in the foreground. The multimedia converter platform 109 may also, or in the alternative, perform time interleaving such that the native audio is played for a time period T1 followed by the provided audio for a time period T2. As a way of example, if one of the contacts in the social network has been visiting Paris, one or more location tagged sounds related to Paris may be used in a created multimedia summary. As another example, if a contact has been posting video files of his newborn baby, elements of the video, such as the sound of the baby crying, may be utilized in the created multimedia summary. As a yet another example, the content of the posted video file may be analyzed to determine that the posted file is about a baby, and images/pictures/animations/text or any other media related to the topic baby may be obtained and utilized as part of the created multimedia summary.

The multimedia entry platform 111 with the multimedia database 119 (e.g., a collection of multimedia signals that are selected by the multimedia converter platform 109 and transmitted to the UE 101) may, for instance, provide updates to the multimedia converter platform 109. By way of example, each time a UE 101 sends a request for multimedia data, the multimedia entry platform 111 automatically updates its multimedia archive (e.g., the multimedia database 119), and updates the multimedia converter platform 109 accordingly. Further, the multimedia entry platform 111 compares the content information of the multimedia pattern and ranks them on the basis of their popularity or relevance at a social media service. For example, when a particular multimedia becomes popular at a social channel of a social media service, the multimedia converter platform 109 may obtain multimedia archived by the multimedia entry platform 111 based on the popular audio pattern, process those multimedia to generate a multimedia based on the content information which is further based on their characteristics, and provide the multimedia signal to the UE 101.

The services platform 113 may include any type of service. By way of example, the services 115 may include social networking services, content (e.g., audio, video, images, etc.) provisioning services, navigational services, application services, storage services, contextual information determination services, location based services, information (e.g., weather, news, etc.) based services, etc. The social networking and content provisioning services may determine publications associated with the UE 101 to supplement or aid in the publications acquired by the applications 103 and/or the sensors 105. The services 115 may interact with the UE 101, the multimedia converter platform 109, multimedia entry platform 111 and the content providers 117a . . . 117n.

By way of example, a social networking service 115 may be an online service that reflects social networks or social relations among users who may share their relationships, interests and/or activities. In one scenario, the social networking service 115 provides representations of each user (e.g., a profile), his/her social links, and a variety of additional information. The social networking service 115 allows users to share ideas, activities, events, and interests within their individual networks, and provides for data portability. The social networking service 115 may additionally assist in providing the multimedia converter platform 109 with "popular audio patterns" associated with content uploaded by users.

The content providers 117 may provide content to the UE 101, the multimedia converter platform 109, the multimedia entry platform 111 and the services 115 of the services platform 113. The content provided may be any type of content, such as textual content, audio content, video content, image content, etc. In one embodiment, the content providers 117 may provide content that may supplement content of the applications 103, the sensors 105, or a combination thereof. By way of example, the content providers 117 may provide content that may aid in the processing of multimedia signal. In one embodiment, the content providers 117 may also store content associated with the UE 101, the multimedia converter platform 109, multimedia entry platform 111 and the services 115 of the services platform 113. In one embodiment, the content providers 117 may manage access to a central repository of data, and offer a consistent, standard interface to data, such as a repository of user multimedia signal content.

By way of example, the UE 101, the multimedia converter platform 109, the multimedia entry platform 111, the services platform 113 and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
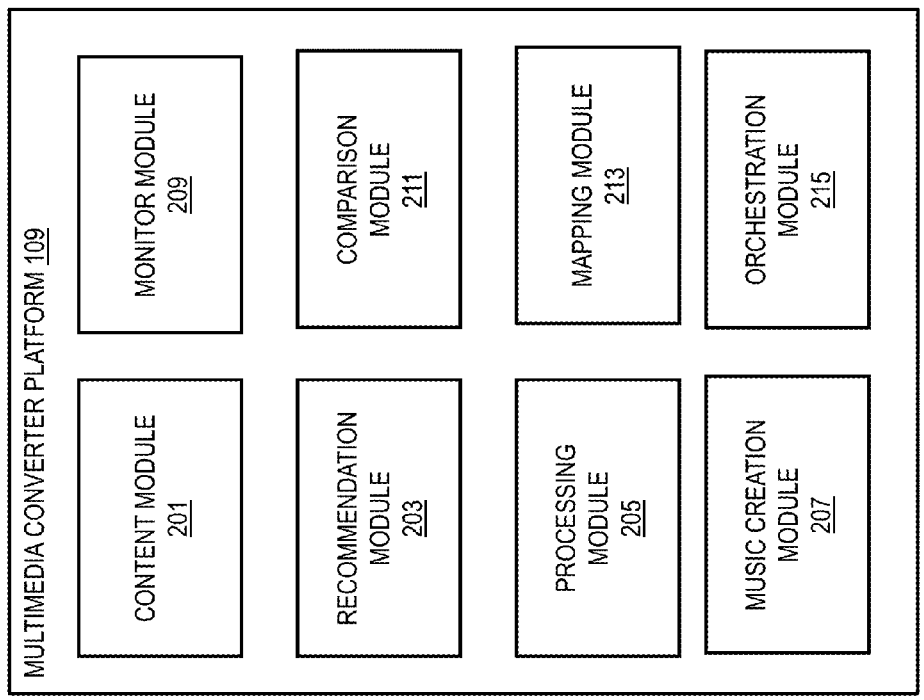
FIG. 2 is a diagram of the components of the multimedia converter platform, according to one embodiment.

FIG. 2 is a diagram of the components of the multimedia converter platform 109, according to one embodiment. By way of example, multimedia converter platform 109 includes one or more components for providing multimedia summaries for content information based on their characteristics. As discussed above, it is contemplated that the functions of these components may be combined in one or more components or performed by other components of equivalent functionality. In this embodiment, the multimedia converter platform 109 includes a content module 201, a recommendation module 203, a processing module 205, a music creation module 207, a monitor module 209, a comparison module 211, a mapping module 213 and an orchestration module 215.

The content module 201 enables the multimedia converter platform 109 to determine the content information associated with a device by collecting or determining content information associated with the device. In one embodiment, the content module 201 may determine content information from the multimedia entry platform 111, the applications 103 executed at the UE 101, the sensors 105 associated with the UE 101, and/or one or more services 115 on the services platform 113. As the UE 101 sends a request for multimedia signal to the multimedia converter platform 109, the content module 201 provides the multimedia converter platform 109 with the content information. The content information provided to the multimedia converter platform 109 can be, for example, social networking information, news feed information, one or more content files, or a combination thereof.

In one embodiment, the content module 201 may track the exchange of multimedia signals for particular users registered with the multimedia converter platform 109 and/or associated with the content information of UE 101. In this manner, the statistical data that is obtained may be used for any suitable purpose, including the selection of multimedia signal. The data may include, for example but not limited to, popularity of particular multimedia signal, popularity of the multimedia signal as a function of the age of the user, popularity of the multimedia signal as a function of the time of day, popularity of multimedia signal as a function of the region of the country, popularity of multimedia signal as a function of the sex of the user, popularity of audio as a function of the demographics of the user, popularity of the multimedia signal as a function of the duration of use by the user, popularity of multimedia signal as a function of the work culture of the user, popularity of audio as a function of the genre of the corresponding audio files, etc.

The recommendation module 203 recommends the multimedia signal based on the preferences of the users associated with the UE 101, which are determined once the content information is processed by the processing module 205. As the content module 201 determines content information, the processing module 205 processes the content information. Next, the recommendation module 203 recommends, according to the rankings of the pattern of the multimedia signal based on popularity, the selection of the multimedia signal based on determined popularity information. The recommendation module 203 determines whether a preferred multimedia signal for the requesting UE 101 is available or not. If a preferred multimedia signal is not available, the recommendation module 203 recommends a multimedia signal preference to the multimedia converter platform 109. In one embodiment, the multimedia converter platform 109 then requests the multimedia signal from, for example, one or more content providers 117. In one embodiment, the multimedia converter platform 109 requests the multimedia information for the social network from, for example, one or more content providers 117. In some embodiments, the user may publish his rating to a multimedia signal. The user may have defined beforehand that a certain rating given by him to a multimedia signal causes the transmission of such signal in certain services and other multimedia signal can be generated on the basis of such user generated ratings. Thus, the user may define that if he rates the media with 5 stars, the multimedia converter platform 109 generates more multimedia signal based on the high rating than if the user would rate the media item with only 1 star.

The processing module 205 enables the multimedia converter platform 109 to process the content information to determine: (a) multimedia signal for devices, (b) rankings of multimedia signal patterns based on popularity information, and (e) selection of multimedia signal based on the preference and popularity amongst the users of UE 101. The processing module 205 may include one or more algorithms that are executed in performing the processing.

The music creation Module 207 creates music which reflects a set of events from a certain time period between users of mobile communication devices. This can be done, for example, by taking a music piece in MIDI (Musical Instrument Digital Interface) format, selected by the user, and by modifying the desired attributes to convey information on the message. For example, the module may speed up the tempo of a multimedia signal to convey to the user of the voluminous information received. This module creates a musical piece depending on the content information of the user. A single musical piece may reflect the overall events in the network, but also individual contacts and/or groups may have their own musical pieces reflecting the actions/messages/status of the respective users/groups.

The monitor module 209 monitors the content information and keeps multimedia database 119 updated. Each time a UE 101 sends a request for a multimedia signal, the monitor module 209 compares the content information and updates the multimedia signal information in the multimedia database 119. The monitor module 209 follows various events and messages available in the social network service, and then stores such activity information, such as, summary statistics related to the events and messages. An example of summary statistics is the amount of messages or status updates in a time period, such as a day. The monitor module 209 monitors for updates continuously, periodically, according to a schedule, on demand, or a combination thereof. In one embodiment, the monitor module 209 ensures that the multimedia signal is free from encryptions that may limit their use, inhibit their copying, inhibit or otherwise limit the number of copies that may be made, time limited durations, etc.

In some embodiments, the comparison module 211 compares the content information and prioritizes the multimedia signal based on its content information and popularity in the social media services. In one scenario, each time a UE 101 sends a request for multimedia signal, the comparison module 211 monitors for updates continuously, periodically, according to a schedule, on demand, or a combination thereof, and pulls information from the multimedia database 119. The comparison module compares the data and transmits the data to the recommendation module 203.

The mapping module 213 stores a set of user defined or inherent set rules for mapping various events or contents to musical qualities. For example, a UE 101 receives numerous content based information, to represent such volume of content a mapping module can control the music tempo, such that the more content information per time period there has been in the social network, the faster is the music tempo in beats per minute (BPM). In addition, a typical mapping is the linking of certain contacts or groups in the social networking service to musical instruments. For example, two most prominent instruments guitar and trumpet can be used to represent the two most active friends in the social network, this group can be given more preference and a distinct music can be created to represent this group. In another embodiment of the invention, the user of a mobile device may assign certain instruments to his contacts.

The orchestration module 215 works with the music creation module 207 to create music periodically or when the user enters the service. The module obtains a set of summary statistics from other modules. Such summary statistic may include, for example, amount of messages in the time period, the list of users who wrote the messages, and the mood of the messages etc. Next, it obtains a list of musical attributes from the activity from the mapping module 213 based on the event statistics. For example, the UE 101 receives more than 100 messages last night, the music tempo should be fast (may be over 160 beats-per-minute (BPM). In addition, friends who were the most active message writers, and their mood information may be obtained from the mapping module 213. A bright guitar can be used to represent that the mood of the user was happy. On the other hand, if the mood of the users were sad then a muted trumpet can represent the sadness. As another example, the instrument corresponding to a user who has been active in the social network (e.g., writing lots of messages) may receive a prominent role in the created musical signal. A prominent role may mean, for example, increasing the loudness of the instrument so that it is well audible in the mix, and/or rendering the instrument in a central spatial location, such as near the middle of the spatial audio field.

Figure 3:
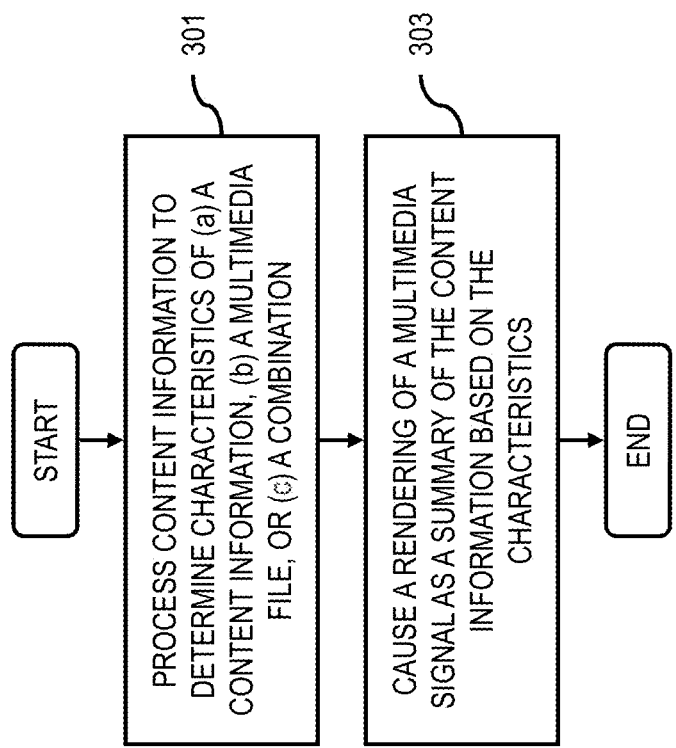
FIG. 3 is a flowchart of a process for providing a multimedia signal as a summary of the content information, according to one embodiment.
Figure 11:
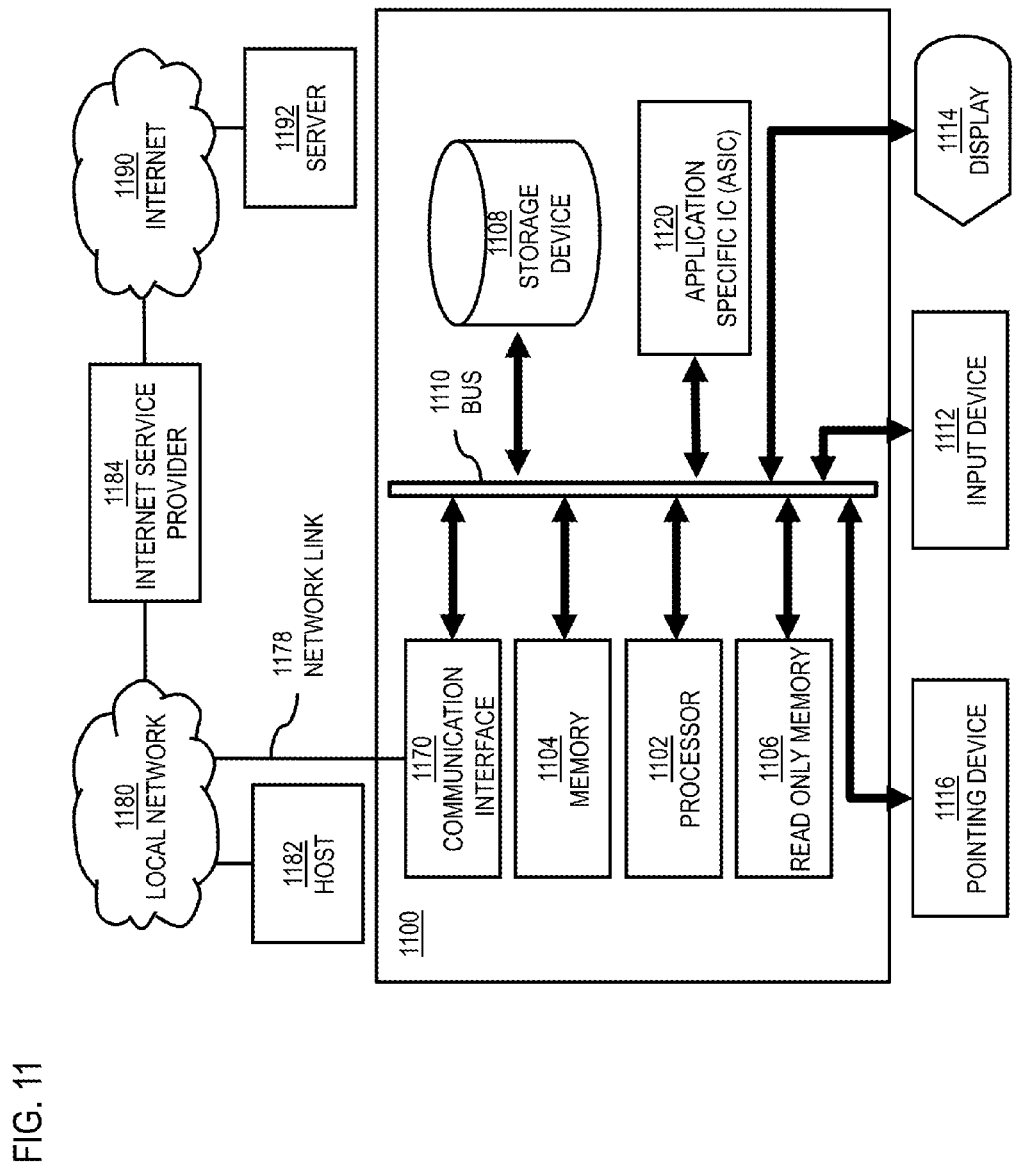
FIG. 11 is a diagram of hardware that can be used to implement an embodiment of the invention.

FIG. 3 is a flowchart of a process for determining a multimedia signal as a summary for the content information based on their characteristics, according to one embodiment. In one embodiment, the multimedia converter platform 109 performs the process 300 and is implemented in, for instance, a chip set including a processor and a memory as shown in FIG. 11.

In step 301, a request for a multimedia signal is sent from a UE 101 to the multimedia converter platform 109. The request may be sent prior to the UE 101 playing a multimedia signal, such as upon receiving a textual data, images, videos, etc. of social networking information, news feed information, one or more content files, or a combination thereof. Such transmission of the request between the UE 101 and the multimedia converter platform 109 results in the multimedia converter platform 109 processing the content information. The content information may include social networking information, news feed information, one or more content files, or a combination thereof. The content information is processed to determine one or more characteristics of (a) the content information, (b) at least one multimedia file, or (c) a combination thereof. Such characteristics of the content information may include but is not limited to, at least in part, a number of content messages, a frequency of content messages, mood information, event information, or a combination thereof. The multimedia signal that is generated includes at least one audio signal, at least one video signal, or a combination thereof.

Thus, the multimedia converter platform 109 takes into consideration the content information of UE 101. The content information may be determined from one or more applications 103 executed by the UE 101, one or more sensors 105 associated with the UE 101, one or more services 115 on the services platform 113, and/or content providers 117.

In step 303, the multimedia converter platform 109 causes a rendering of the at least one multimedia signal as at least one summary of the content information based, at least in part, on the one or more characteristics. As discussed in detail below, the multimedia converter platform 109 may process the content information based on their characteristics to determine a multimedia signal. Accordingly, the multimedia converter platform 109 may provide a multimedia signal to the requesting UE 101.

Figure 4:
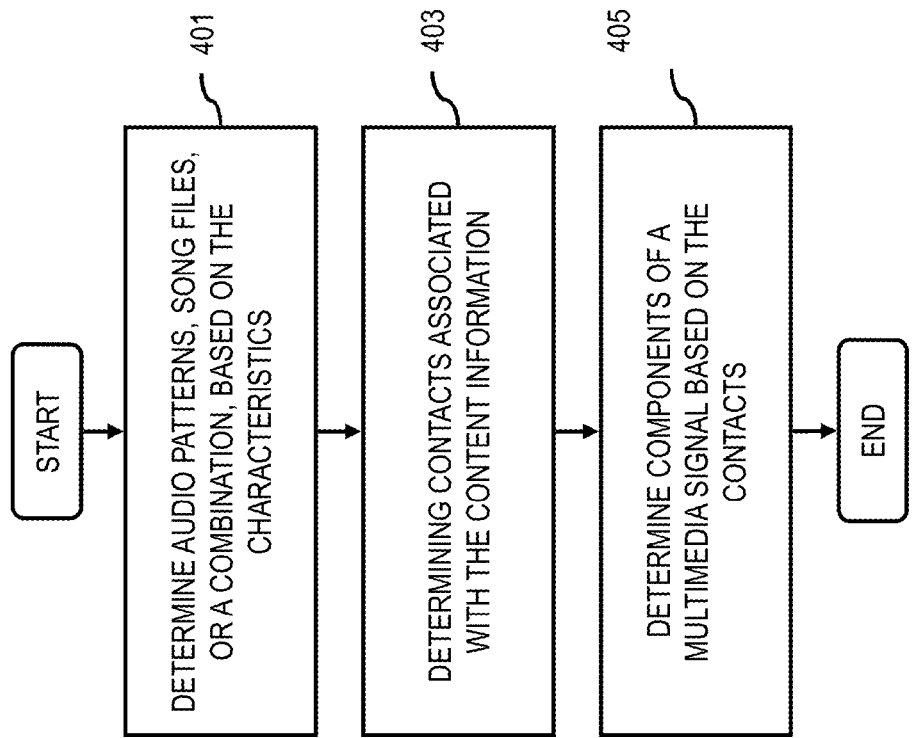
FIG. 4 is a flowchart of a process for determining components of a multimedia signal based on the contacts associated with content information, according to one embodiment.

FIG. 4 is a flowchart of a process for determining a multimedia summary for the content information based on their characteristics, according to one embodiment. In one embodiment, the multimedia converter platform 109 performs the process 400 and is implemented in, for instance, a chip set including a processor and a memory as shown in FIG. 11.

In step 401 the multimedia converter platform 109 determines audio patterns, song files, or a combination thereof based, at least in part, on the characteristics, wherein the audio patterns, the song files, or a combination thereof comprises the at least one multimedia signal. According to one embodiment, a multimedia converter platform 109 receives a request for a multimedia signal, the multimedia converter platform 109 may dynamically determine the content information associated with the device. Upon determining the content information, the multimedia converter platform 109 may determine a characteristic of the content information. Then, the multimedia converter platform 109 may determine the audio patterns or songs files based on the characteristics of the content information.

In step 403 the multimedia converter platform 109 determines contacts associated with the content information. The multimedia converter platform 109 may further determine the contact information associated with the devices to determine a multimedia signal that is effective and represents the context of the message writer, for example, the mood of the writers based on the content information, or the frequency of the communication with the writers on the basis of which earlier set multimedia signals can be modified as per the new information, if any.

In step 405 the multimedia converter platform 109 determines components of a multimedia signal based, at least in part, on the contacts. Such components may include, at least in part, instruments, positions of the components in a spatial audio field represented in the at least one multimedia file, or a combination thereof. For example, importance of contacts are mapped to a position in spatial audio field, an important friend controls instrument characteristics. When a friend becomes important, he is brought to center in spatial audio field. The importance is analyzed from the volume of messages and/or their content. On the other hand, less important persons may be rendered in the back in the spatial audio field. In one embodiment, such ability of manual emphasizing, such as a zooming, to a certain preferred groups in a social network, and creating a multimedia signal based on the characteristic of such cluster, helps the user identify the multimedia signal better and/or to get a better understanding of recent events related to those groups in the social network. When a user within the preferred group writes a message, the user hears the auralized multimedia signal created specifically for the preferred group. Further, the user can manually group and lock the sounds of particular users into a cluster that is panned into a certain position in the stereo or surround audio field. This process is further represented in FIG. 9.

Figure 5:
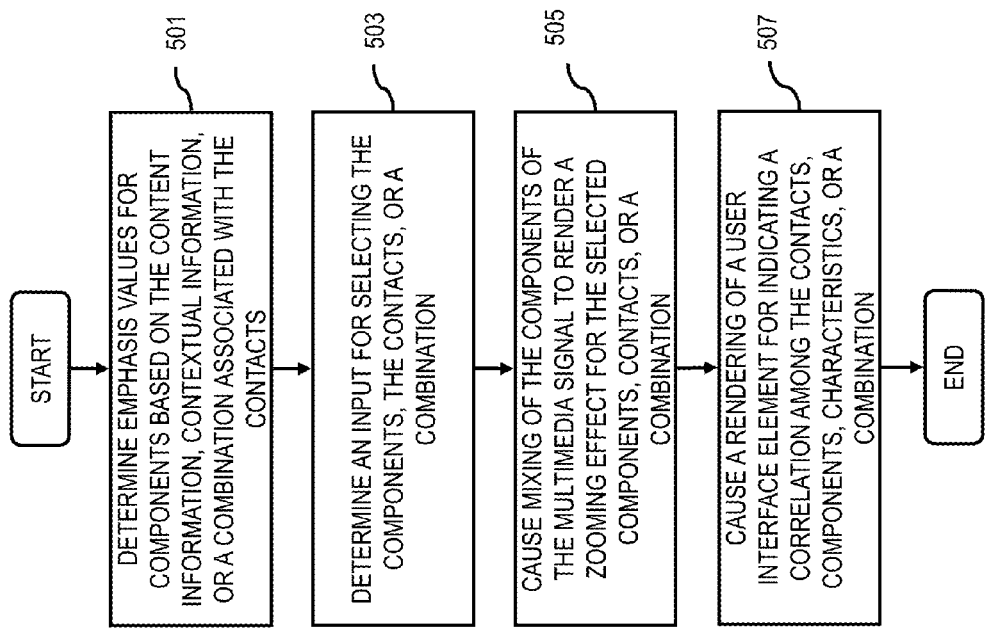
FIG. 5 is a flowchart of a process for causing a mixing of the components of the multimedia signal to render a zooming effect, according to one embodiment.

FIG. 5 is a flowchart of a process for determining a multimedia summary for the content information based on their characteristics, according to one embodiment. In one embodiment, the multimedia converter platform 109 performs the process 500 and is implemented in, for instance, a chip set including a processor and a memory as shown in FIG. 11.

In step 501, the multimedia converter platform 109 determines emphasis values for the components based, at least in part, on the content information, contextual information, or a combination thereof associated with the one or more contacts. Then, the multimedia signal is rendered to the UE 101 based, at least in part, on the emphasis values. The multimedia converter platform 109 determines one or more emphasis values for the devices based, at least in part, on the ranking generated from the content information, contextual information, or a combination thereof. The multimedia converter platform 109 may emphasize on the popular multimedia signal, for example, higher ranked multimedia signal is given more emphasis in terms of determining a multimedia signal than lower ranked multimedia signal. By way of example, in terms of social proximity, users that are ranked higher in contacts of UE 101 may be given higher emphasis because the user of the requesting device may give higher significance to, for example, the messages of the users of the higher ranked contacts. The multimedia converter platform 109 may place more significance in the content and/or context information of the close friend circle rather than the whole contact of UE 101.

In step 503, the multimedia converter platform 109 determines an input for selecting at least one of the components, the contacts, or a combination thereof. Next, the multimedia converter platform 109 causes, at least in part, a mixing of the components of the at least one multimedia signal to render an emphasizing effect, such as a zooming effect, for the selected components, the selected contacts, or a combination thereof (step 505). In one embodiment, the multimedia converter platform 109 identifies and provides the user with multiple social media services for mixing multimedia signals based on content information. To enhance user experience, the multimedia converter platform 109 may, for instance, look for ways to mix the multimedia signal which may be more relevant to recent social media activities than the previous one, for example, the most relevant fits for a most recently discussed topic etc. Such mixing will further enhance the zooming effect discussed above. For instance, the multimedia converter platform 109 may synthesize the sound/music on the client device based on known methods for music creation and synthesis, e.g. Musical Instrument Digital Interface MIDI, including various Downloadable Sounds (DLS) formats for instruments, such as DLS-1, DLS-2, or Mobile DLS. Further, it can also remix existing songs based on these parameters. For example, adding a certain instrument, changing tempo, transposing to a different key using pitch shifting techniques etc.

In step 507, the multimedia converter platform 109 causes, at least in part, a rendering of a user interface element for indicating a correlation among the contacts, the components, the characteristics, or a combination thereof. As discussed in detail below, when contacts become important, they are brought to the center in spatial audio field. The importance is analyzed from the volume of messages and/or their content. When two or more important contacts generate the most similar music (by themselves or through their social networks), they are recommended to each other, and the UE 101 detect the similarity. Such correlation helps in mixing the multimedia signal.

Figure 6:
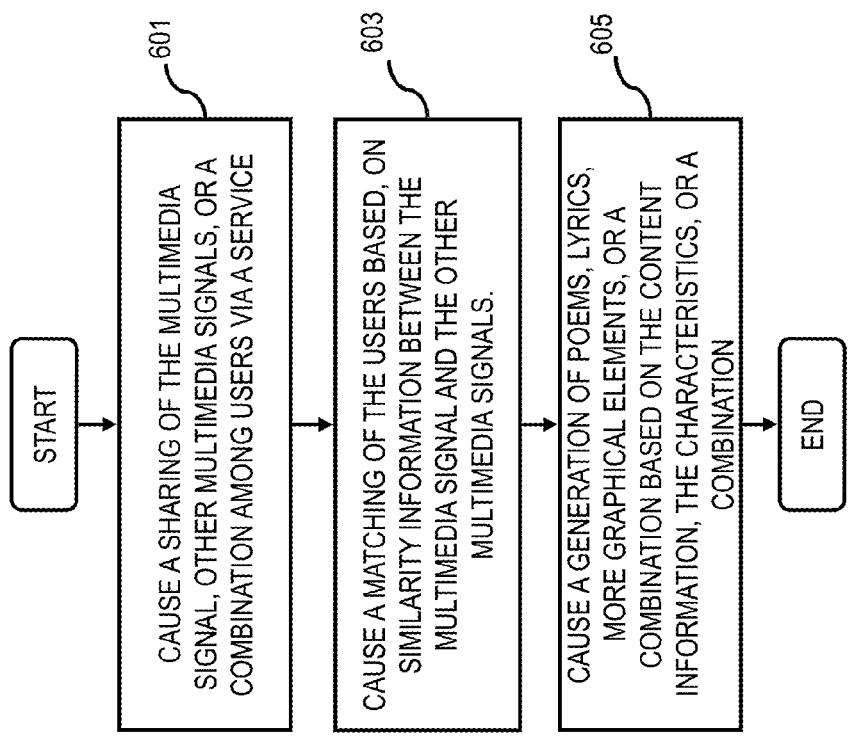
FIG. 6 is a flowchart of a process for generating textual and/or graphical elements based on the content information and/or characteristics, according to one embodiment.

FIG. 6 is a flowchart of a process for determining a multimedia summary for the content information based on their characteristics, according to one embodiment. In one embodiment, the multimedia converter platform 109 performs the process 600 and is implemented in, for instance, a chip set including a processor and a memory as shown in FIG. 11.

In step 601, the multimedia converter platform 109 causes a sharing of multimedia signal, other multimedia signals, or a combination thereof among users via at least one service.

In step 603, the multimedia converter platform 109 causes a matching of the one or more users based, at least in part, on similarity information between the at least one multimedia signal and the one or more other multimedia signals. In one embodiment, when two or more important contacts generate the most similar music (by themselves or through their social networks), they are recommended to each other so that these users music themes are brought to each other's soundscapes, such correlation helps in mixing the multimedia signal.

In step 605, the multimedia converter platform 109 causes a generation of poems, lyrics, graphical elements, or a combination thereof based, at least in part, on the content information, the characteristics, or a combination thereof. In one embodiment of the invention, the method applies to automatic poem generation from the content information. The generated poems are then vocalized using a singing synthesizer, the poem generator is used to pick words from one or more friend status updates, and generate the lyrics (poem) in a desired style. The style may depend on the favorite poet of the corresponding contact or the user himself, and/or the current mood of the friend. In another embodiment of the invention, the system obtains keywords from the content information, such keywords are used to search for suitable comic strips, the comic strips are further personalized, for example, some graphical elements may be replaced with actual content provided by users or generic clip art content that is personalized through the captions texts obtained from the content information. As an optional embodiment, the music is created so that every comic frame has a different background summary music.

Figure 7:
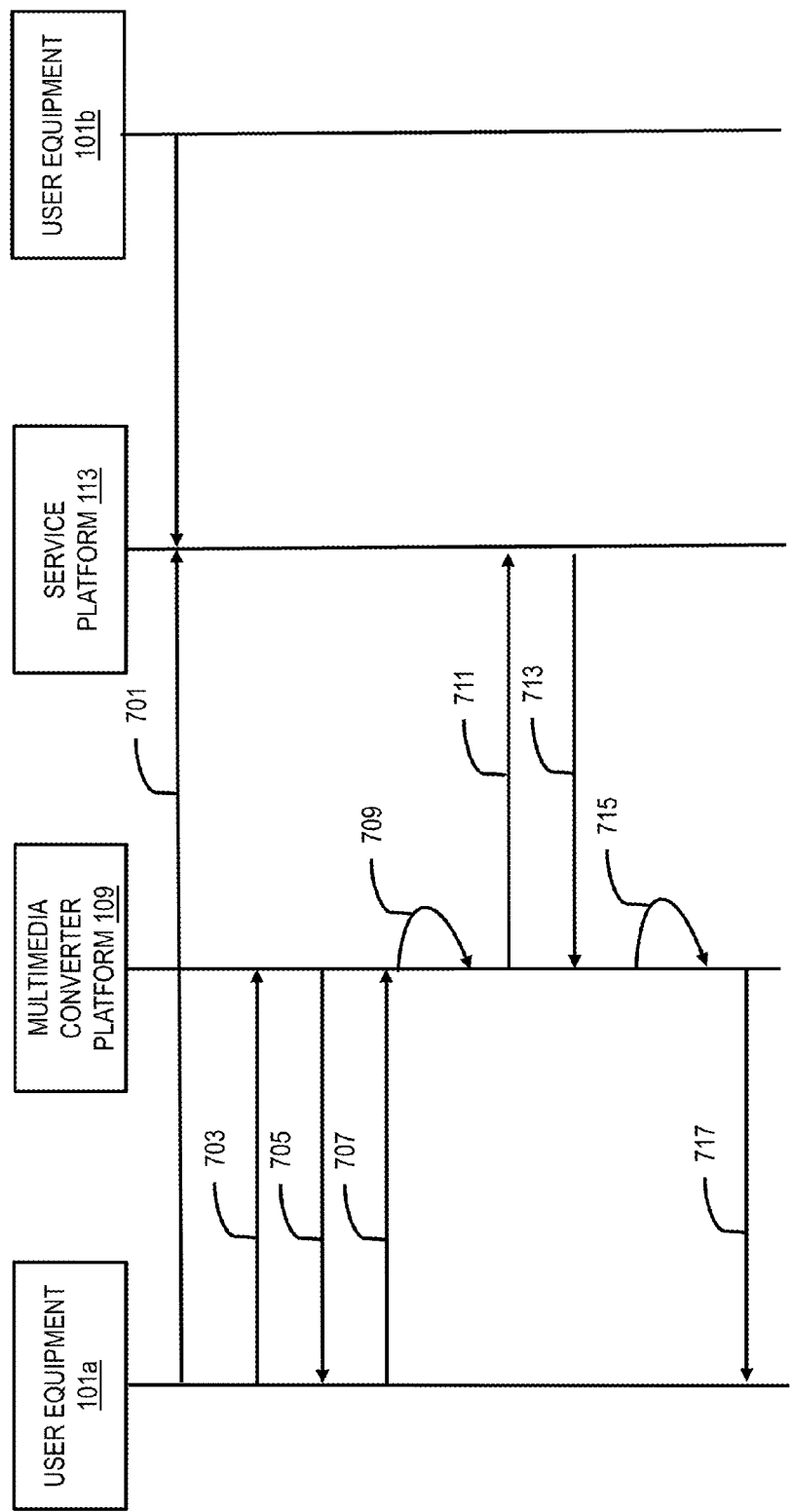
FIG. 7 is a ladder diagram that illustrates a sequence of processes used in providing a multimedia signal as a summary of the content information, according to one embodiment.

FIG. 7 is a ladder diagram that illustrates a sequence of processes used in determining a multimedia summary 700 for content information, according to one embodiment. In step 701, a UE 101a and UE 101b communicate via service platform 113. Then, in step 703, a UE 101a generates a request for a multimedia summary and sends the request to the multimedia converter platform 109. The multimedia converter platform 109 retrieves the content information of the UE 101 from the applications 103, the sensors 105, the databases 119, and processes the content information to obtain, for example, the popular multimedia of the UE 101. In one embodiment, the multimedia converter platform 109 sends a request to the UE 101 to update the content information (step 705). The UE 101a then transmits updates on the activity in the content information, if any (step 707).

In step 709, the multimedia converter platform 109 determines the characteristics of the content information. The multimedia converter platform 109 then determines multimedia signal patterns based on the characteristics. In one scenario, the multimedia converter platform 109 sends a request for updates on popular multimedia signal information in the service platform 113 (step 711) and after receiving the required information from the service platform 113 (step 713), compares it with the content information received from UE 101. The multimedia converter platform 109 modifies the multimedia signal as per requirement, accordingly.

In one embodiment, the UE 101 that requested the multimedia signal may include within the request information the type of multimedia signal. In such an embodiment, the multimedia converter platform 109 can, for example, skip steps 711 and 713 discussed above. In step 715, the multimedia converter platform 109 then computes the set of preferred multimedia signal based on the collected information. The multimedia converter platform 109 processes the request to get a suitable multimedia signal and transmits the multimedia signal to the UE 101 (step 717).

Figure 8:
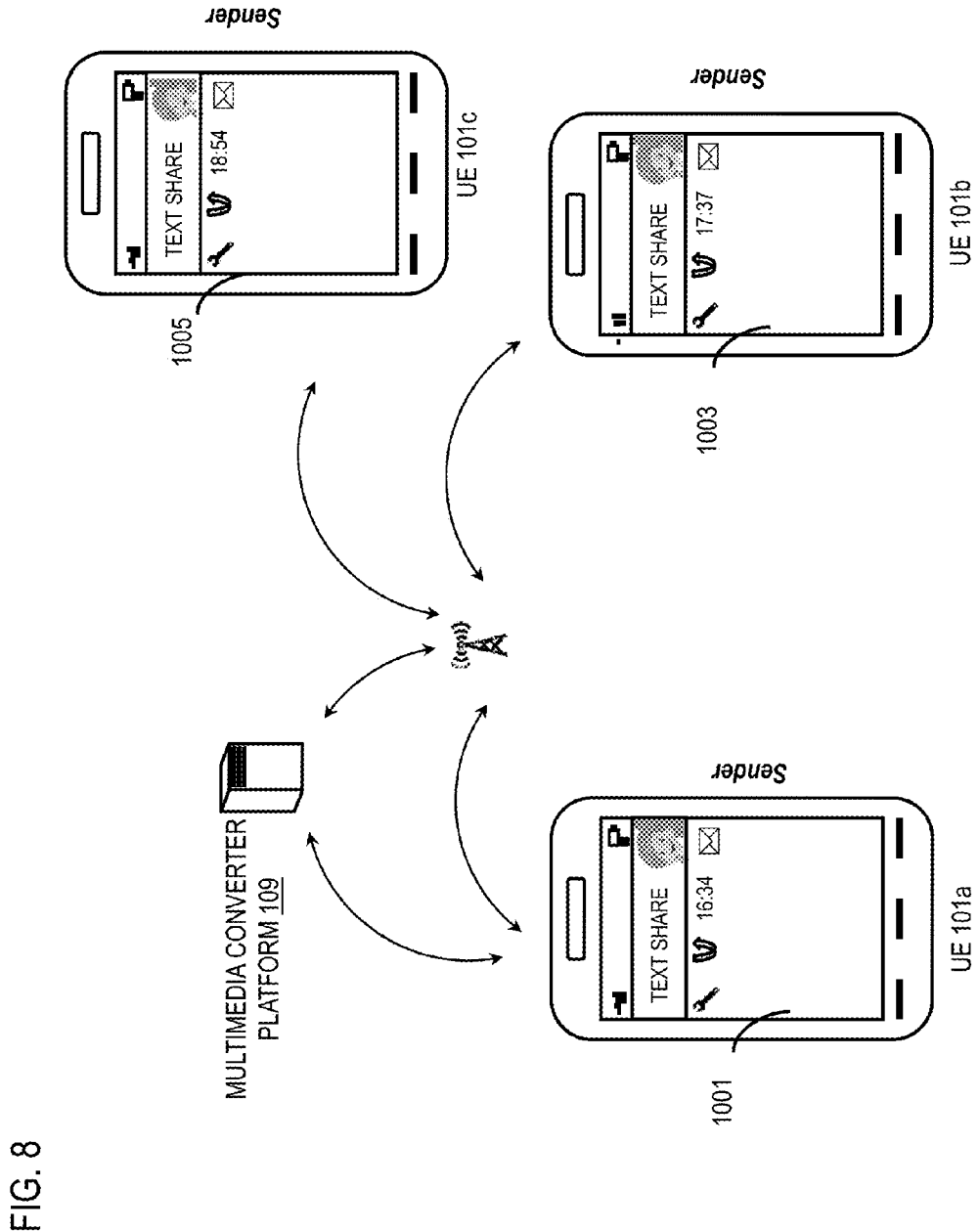
FIG. 8 is a diagram of one or more user interfaces utilized in the process of FIGS. 3-6, according to various embodiments.

FIG. 8 is a diagram of user interfaces utilized in the processes of FIGS. 3-6, according to various embodiments. As illustrated, UE 101a, UE 101b and UE 101c have user interfaces 1001, 1003, and 1005, respectively. Whenever a multimedia signal is to be played on, for example, UE 101a, the multimedia converter platform 109 dynamically selects a multimedia signal based on the content information and contextual information of the request sending UE (UE 101a). As discussed above, the content information includes, but is not limited to, social networking information, news feed information, one or more content files, or a combination thereof. On the other hand, contextual information includes, but is not limited to, user profile information, user preference information, location information, temporal information, activity information, or a combination thereof. By way of example, the UE 101a sends a request to the multimedia converter platform 109 to get a suitable multimedia signal each time the UE 101a audibly responds to an action or event at the UE 101a (e.g., receiving textual data, images, videos, etc. of social networking information, news feed information, one or more content files, or a combination thereof.).

According to one embodiment, the multimedia converter platform 109 is connected to the communication network and the UE 101a, amongst other networks and communication devices. It acquires the content information from UE 101a and the contextual information from the service platform 113 and content provider 117 via the communication network.

The multimedia converter platform 109 processes the information received and determines a multimedia signal which is then transmitted to UE 101a.

Figure 9:
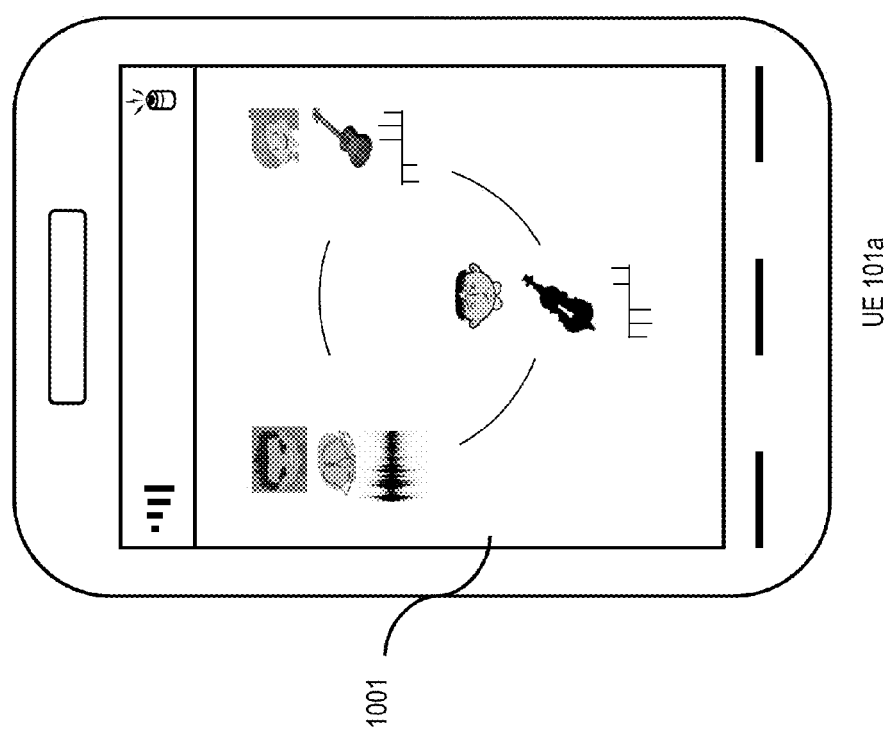
FIG. 9 is a diagram of one or more user interfaces utilized in the process of FIGS. 3-6, according to various embodiments.

FIG. 9 is a diagram of user interfaces utilized in the processes of FIGS. 3-6, according to various embodiments. As illustrated, UE 101a has user interfaces 1001, it is visualization of a process where few contacts associated with the content information of UE 101a become important, then they are brought to the center in spatial audio field. The importance is analyzed from the volume of messages and/or their content. On the other hand, less important persons may be rendered in the back in the spatial audio field. Further, a user's contacts' are shown in a "portrait" photo. Beneath the portrait photo, that user's sound or musical part is animated live through its waveform as it happens, making it possible for the user to see which user produces which sound. The user can also mute the auralizations from specific users e.g. by tapping on their icons.

According to one embodiment, a user may map different friends to different musical instruments based on the mood of the message writers. An icon of an instrument can be used to represent contacts associated with the content information on the basis of the information obtained from the mapping to represent a mood, for example, if a writer is angry he may be mapped to a pictorial representation of "ringing bells", if a writer is happy he may be mapped to a pictorial representation of "a guitar", etc. Such ability of manual zooming to a certain preferred groups in a social network, and creating a multimedia signal based on the characteristic of such cluster, helps the user identify the multimedia signal better.

Figure 10:
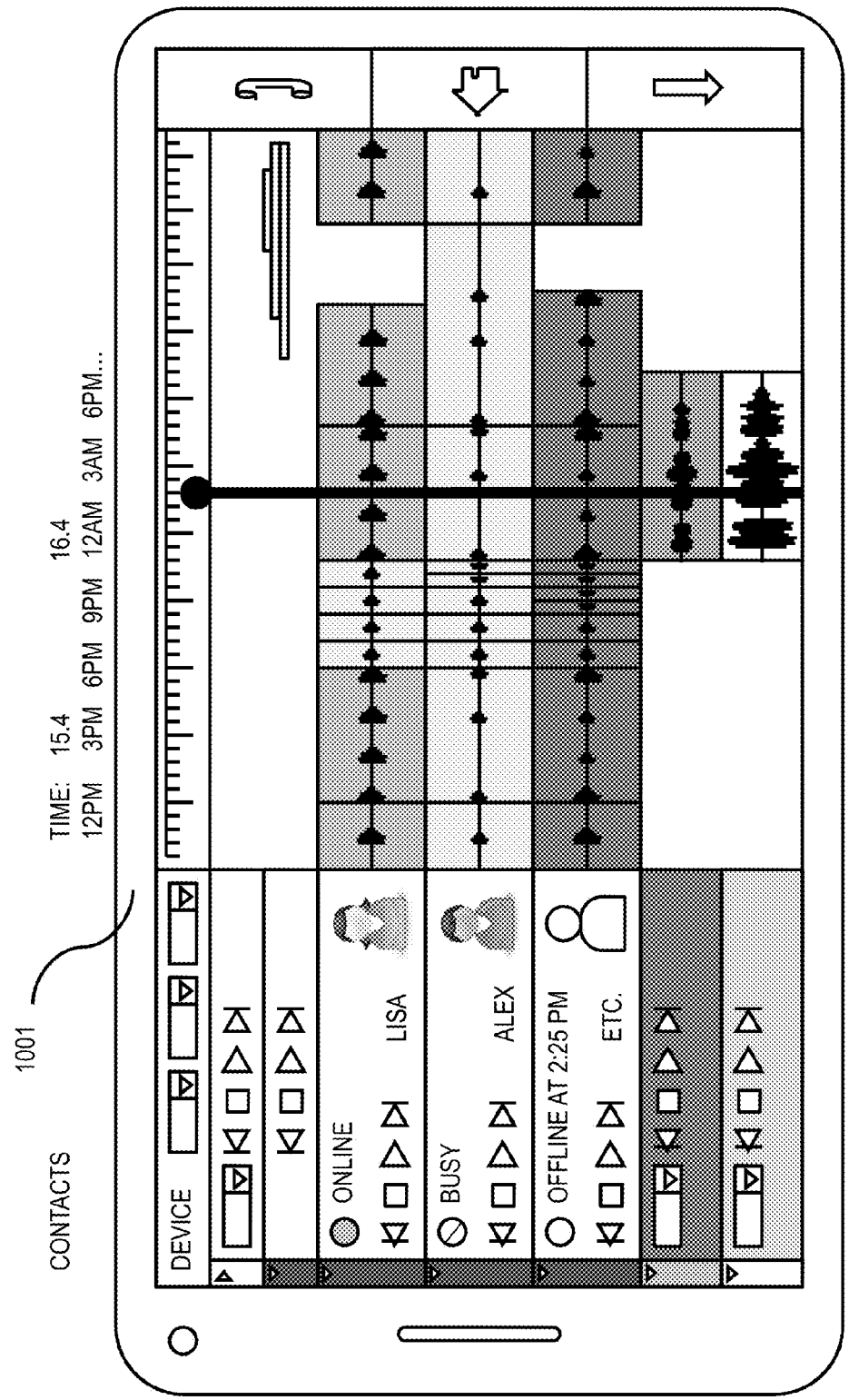
FIG. 10 is a diagram of one or more user interfaces utilized in the process of FIGS. 3-6 according to various embodiments.

FIG. 10 is a diagram of user interfaces utilized in the processes of FIGS. 3-6, according to various embodiments. As illustrated, UE 101a has user interfaces 1001, the user's contacts are shown in a music sequencer software display format. The display comprises several tracks on top of each other, and which are rendered together when the music is playing. The user may control the volume of different friends in the mix, or change their pan position in the stereo field. In addition, the user can see through the "actual-time" timeline when something occurred that made a change in the contact's activity auralization. This visualization also shows when the contacts' have been offline, or outside network coverage, as there is a gap in their tracks. The waveform graphic gives some indication of how busy the contact has been (e.g., the general amount of activity in social network between the users is mapped to music complexity). The current audio playback position is indicated by the thick vertical line. Through the timeline, the user may listen to auralization from the past activities as well. In addition to this, other media created by the contacts (e.g. thumbnails of photos) at a certain time may be shown on the timeline.

The processes described herein for providing a multimedia summary for content information may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 11 illustrates a computer system 1100 upon which an embodiment of the invention may be implemented. Although computer system 1100 is depicted with respect to a particular device or equipment, it is contemplated that other devices or equipment (e.g., network elements, servers, etc.) within FIG. 11 can deploy the illustrated hardware and components of system 1100. Computer system 1100 is programmed (e.g., via computer program code or instructions) for multimedia conversion of content information as described herein and includes a communication mechanism such as a bus 1110 for passing information between other internal and external components of the computer system 1100. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of multimedia conversion of content information.

A bus 1110 includes one or more parallel conductors of information so that information is transferred quickly among devices coupled to the bus 1110. One or more processors 1102 for processing information are coupled with the bus 1110.

A processor (or multiple processors) 1102 performs a set of operations on information as specified by computer program code related to multimedia conversion of content information. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1110 and placing information on the bus 1110. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1102, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1100 also includes a memory 1104 coupled to bus 1110. The memory 1104, such as a random access memory (RAM) or any other dynamic storage device, stores information including processor instructions for multimedia conversion of content information. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of processor instructions. The computer system 1100 also includes a read only memory (ROM) 1106 or any other static storage device coupled to the bus 1110 for storing static information, including instructions, that is not changed by the computer system 1100. Some memory is composed of volatile storage that loses the information stored thereon when power is lost. Also coupled to bus 1110 is a non-volatile (persistent) storage device 1108, such as a magnetic disk, optical disk or flash card, for storing information, including instructions, that persists even when the computer system 1100 is turned off or otherwise loses power.

Information, including instructions for multimedia conversion of content information, is provided to the bus 1110 for use by the processor from an external input device 1112, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1100. Other external devices coupled to bus 1110, used primarily for interacting with humans, include a display device 1114, such as a cathode ray tube (CRT), a liquid crystal display (LCD), a light emitting diode (LED) display, an organic LED (OLED) display, a plasma screen, or a printer for presenting text or images, and a pointing device 1116, such as a mouse, a trackball, cursor direction keys, or a motion sensor, for controlling a position of a small cursor image presented on the display 1114 and issuing commands associated with graphical elements presented on the display 1114. In some embodiments, for example, in embodiments in which the computer system 1100 performs all functions automatically without human input, one or more of external input device 1112, display device 1114 and pointing device 1116 is omitted.

In the illustrated embodiment, special purpose hardware, such as an application specific integrated circuit (ASIC) 1120, is coupled to bus 1110. The special purpose hardware is configured to perform operations not performed by processor 1102 quickly enough for special purposes. Examples of ASICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1100 also includes one or more instances of a communications interface 1170 coupled to bus 1110. Communication interface 1170 provides a one-way or two-way communication coupling to a variety of external devices that operate with their own processors, such as printers, scanners and external disks. In general the coupling is with a network link 1178 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. Wireless links may also be implemented. For wireless links, the communications interface 1170 sends or receives or both sends and receives electrical, acoustic or electromagnetic signals, including infrared and optical signals, that carry information streams, such as digital data. For example, in wireless handheld devices, such as mobile telephones like cell phones, the communications interface 1170 includes a radio band electromagnetic transmitter and receiver called a radio transceiver. In certain embodiments, the communications interface 1170 enables connection to the communication network 107 for multimedia conversion of content information to the UE 101.

The term "computer-readable medium" as used herein refers to any medium that participates in providing information to processor 1102, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1108. Volatile media include, for example, dynamic memory 1104. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1120.

Network link 1178 typically provides information communication using transmission media through one or more networks to other devices that use or process the information. For example, network link 1178 may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190.

A computer called a server host 1192 connected to the Internet hosts a process that provides a service in response to information received over the Internet. For example, server host 1192 hosts a process that provides information representing video data for presentation at display 1114. It is contemplated that the components of system 1100 can be deployed in various configurations within other computer systems, e.g., host 1182 and server 1192.

At least some embodiments of the invention are related to the use of computer system 1100 for implementing some or all of the techniques described herein. According to one embodiment of the invention, those techniques are performed by computer system 1100 in response to processor 1102 executing one or more sequences of one or more processor instructions contained in memory 1104. Such instructions, also called computer instructions, software and program code, may be read into memory 1104 from another computer-readable medium such as storage device 1108 or network link 1178. Execution of the sequences of instructions contained in memory 1104 causes processor 1102 to perform one or more of the method steps described herein. In alternative embodiments, hardware, such as ASIC 1120, may be used in place of or in combination with software to implement the invention. Thus, embodiments of the invention are not limited to any specific combination of hardware and software, unless otherwise explicitly stated herein.

The signals transmitted over network link 1178 and other networks through communications interface 1170, carry information to and from computer system 1100. Computer system 1100 can send and receive information, including program code, through the networks 1180, 1190 among others, through network link 1178 and communications interface 1170. In an example using the Internet 1190, a server host 1192 transmits program code for a particular application, requested by a message sent from computer 1100, through Internet 1190, ISP equipment 1184, local network 1180 and communications interface 1170. The received code may be executed by processor 1102 as it is received, or may be stored in memory 1104 or in storage device 1108 or any other non-volatile storage for later execution, or both. In this manner, computer system 1100 may obtain application program code in the form of signals on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infra-red transmitter to convert the instructions and data to a signal on an infra-red carrier wave serving as the network link 1178. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

Figure 12:
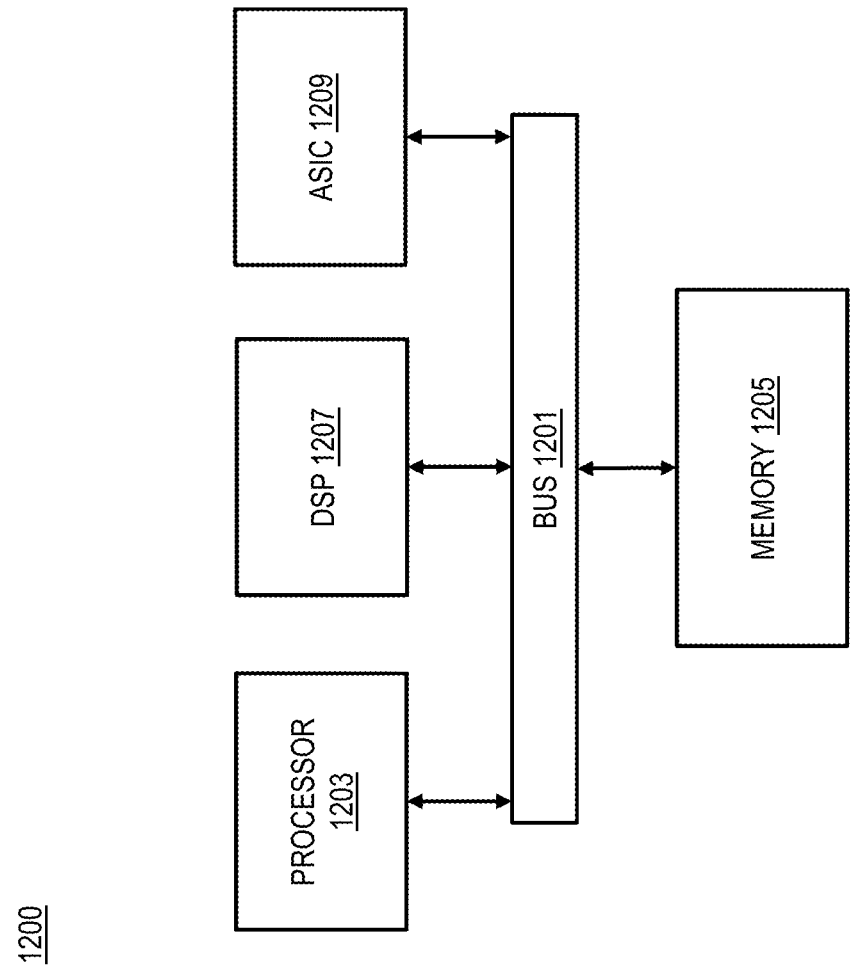
FIG. 12 is a diagram of a chip set that can be used to implement an embodiment of the invention.

FIG. 12 illustrates a chip set or chip 1200 upon which an embodiment of the invention may be implemented. Chip set 1200 is programmed to cause multimedia conversion of content information as described herein and includes, for instance, the processor and memory components described with respect to FIG. 11 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1200 can be implemented in a single chip. It is further contemplated that in certain embodiments the chip set or chip 1200 can be implemented as a single "system on a chip." It is further contemplated that in certain embodiments a separate ASIC would not be used, for example, and that all relevant functions as disclosed herein would be performed by a processor or processors. Chip set or chip 1200, or a portion thereof, constitutes a means for performing one or more steps of providing user interface navigation information associated with the availability of functions. Chip set or chip 1200, or a portion thereof, constitutes a means for performing one or more steps of multimedia conversion of content information.

In one embodiment, the chip set or chip 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1200 includes merely one or more processors and some software and/or firmware supporting and/or relating to and/or for the one or more processors.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform the inventive steps described herein to cause multimedia conversion of content information. The memory 1205 also stores the data associated with or generated by the execution of the inventive steps.

Figure 13:
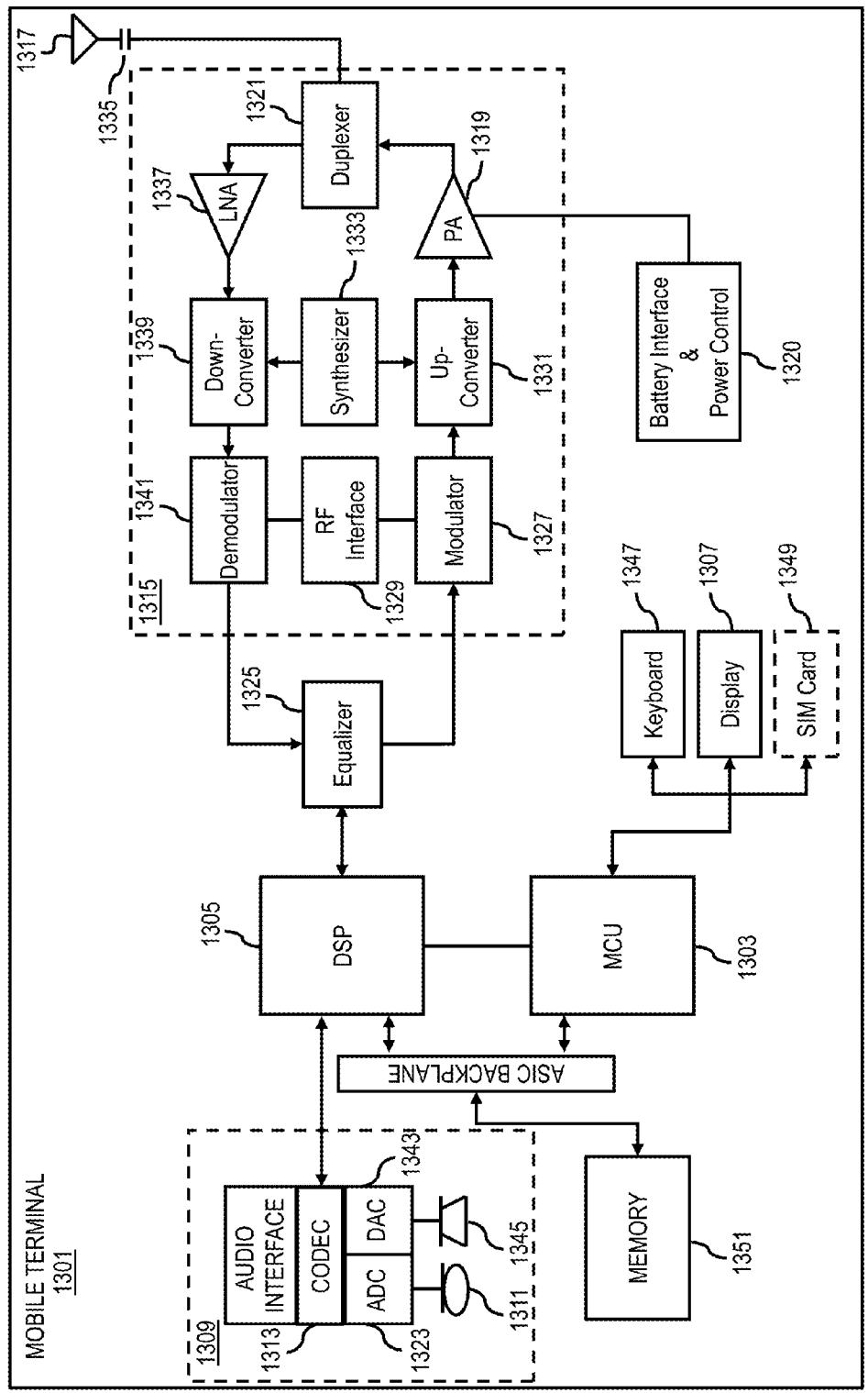
FIG. 13 is a diagram of a mobile terminal (e.g., handset) that can be used to implement an embodiment of the invention.

FIG. 13 is a diagram of exemplary components of a mobile terminal (e.g., handset) for communications, which is capable of operating in the system of FIG. 1, according to one embodiment. In some embodiments, mobile terminal 1301, or a portion thereof, constitutes a means for performing one or more steps of multimedia conversion of content information. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps of multimedia conversion of content information. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs user interface software to facilitate user control of at least some functions of the mobile terminal 1301 to cause multimedia conversion of content information. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network. The card 1349 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    processing content information to determine one or more characteristics of (a) the content information, (b) at least one multimedia file, or (c) a combination thereof;
    rendering, by a renderer, at least one multimedia signal as at least one summary of the content information based, at least in part, on the one or more characteristics;
    determining, by a determiner, one or more emphasis values for one or more components of the at least one multimedia signal, based, at least in part, on the content information, contextual information, or a combination thereof, associated with one or more contacts, the one or more contacts being associated with the content information; and
    determining, by the determiner, the one or more components of the at least one multimedia signal based, at least in part, on the one or more contacts,
    wherein the rendering of the at least one multimedia signal is based, at least in part, on the one or more emphasis values.

2. A method of claim 1, wherein the content information comprises, at least in part, social networking information, news feed information, one or more content files, or a combination thereof; and wherein the at least one multimedia signal comprises at least one audio signal, at least one video signal, or a combination thereof.

3. A method of claim 1, wherein the one or more characteristics of the content information comprise, at least in part, a number of content messages, a frequency of content messages, mood information, event information, or a combination thereof.

4. A method of claim 1, further comprising:
    determining one or more audio patterns, one or more song files, or a combination thereof based, at least in part, on the one or more characteristics,
    wherein the one or more audio patterns, the one or more song files, or a combination thereof comprise the at least one multimedia signal.

5. A method of claim 1, further comprising:
    wherein the one or more components comprise, at least in part, one or more instruments, one or more positions of the one or more components in a spatial audio field represented in the at least one multimedia file, or a combination thereof.

6. A method of claim 1, further comprising:
    determining an input for selecting at least one of the one or more components, the one or more contacts, or a combination thereof; and
    mixing the one or more components of the at least one multimedia signal to render at least an emphasizing effect for the selected one or more components, the selected one or more contacts, or a combination thereof.

7. A method of claim 1, further comprising:
    rendering a user interface element for indicating a correlation among the one or more contacts, the one or more components, the one or more characteristics, or a combination thereof.

8. A method of claim 1, further comprising:
sharing the at least one multimedia signal, one or more other multimedia signals, or a combination thereof among one or more users via at least one service; and
matching the one or more users based, at least in part, on similarity information between the at least one multimedia signal and the one or more other multimedia signals.

9. A method of claim 1, further comprising:
generating one or more poems, one or more lyrics, one or more graphical elements, or a combination thereof based, at least in part, on the content information, the one or more characteristics, or a combination thereof,
wherein the at least one multimedia signal is based, at least in part, on the one or more poems, the one or more lyrics, the one or more graphical elements, or a combination thereof.

10. An apparatus comprising:
at least one processor; and
at least one memory including computer program code for one or more programs,
the at least one memory and the computer program code configured to, with the at least one processor, cause the apparatus to perform at least the following,
process content information to determine one or more characteristics of (a) the content information, (b) at least one multimedia file, or (c) a combination thereof;
render at least one multimedia signal as at least one summary of the content information based, at least in part, on the one or more characteristics;
determine one or more emphasis values for one or more components of the at least one multimedia signal based, at least in part, on the content information, contextual information, or a combination thereof associated with the one or more contacts, the contacts being associated with the content information; and
determine the one or more components of the at least one multimedia signal based, at least in part, on the one or more contacts,
wherein the rendering of the at least one multimedia signal is based, at least in part, on the one or more emphasis values.

11. An apparatus of claim 10, wherein the content information comprises, at least in part, social networking information, news feed information, one or more content files, or a combination thereof; and wherein the at least one multimedia signal comprises at least one audio signal, at least one video signal, or a combination thereof.

12. An apparatus of claim 10, wherein the one or more characteristics of the content information comprise, at least in part, a number of content messages, a frequency of content messages, mood information, event information, or a combination thereof.

13. An apparatus of claim 10, wherein the apparatus is further caused to:
determine one or more audio patterns, one or more song files, or a combination thereof based, at least in part, on the one or more characteristics,
wherein the one or more audio patterns, the one or more song files, or a combination thereof comprise the at least one multimedia signal.

14. An apparatus of claim 10,
wherein the one or more components comprise, at least in part, one or more instruments, one or more positions of the one or more components in a spatial audio field represented in the at least one multimedia file, or a combination thereof.

15. An apparatus of claim 10, wherein the apparatus is further caused to:
determine an input for selecting at least one of the one or more components, the one or more contacts, or a combination thereof; and
mix the one or more components of the at least one multimedia signal to render at least an emphasizing effect for the selected one or more components, the selected one or more contacts, or a combination thereof.

16. An apparatus of claim 10, wherein the apparatus is further caused to:
render a user interface element for indicating a correlation among the one or more contacts, the one or more components, the one or more characteristics, or a combination thereof.

17. An apparatus of claim 10, wherein the apparatus is further caused to:
share the at least one multimedia signal, one or more other multimedia signals, or a combination thereof among one or more users via at least one service; and
match the one or more users based, at least in part, on similarity information between the at least one multimedia signal and the one or more other multimedia signals.

18. An apparatus of claim 10, wherein the apparatus is further caused to:
generate one or more poems, one or more lyrics, one or more graphical elements, or a combination thereof based, at least in part, on the content information, the one or more characteristics, or a combination thereof,
wherein the at least one multimedia signal is based, at least in part, on the one or more poems, the one or more lyrics, the one or more graphical elements, or a combination thereof.

19. A method of claim 1, wherein the one or more emphasis values is based, at least in part, on a ranking generated from the content information, contextual information, or a combination thereof.

20. An apparatus of claim 10, wherein the one or more emphasis values is based, at least in part, on a ranking generated from the content information, contextual information, or a combination thereof.

* * * * *